United States Patent [19]
Hayashida et al.

[11] Patent Number: 5,366,035
[45] Date of Patent: Nov. 22, 1994

[54] REAR WHEEL STEERING DEVICE AND METHOD FOR REAR WHEEL STEERING

[75] Inventors: Tatsuaki Hayashida, Kanagawa; Shozo Kawasawa, Tokyo; Katsushi Matsuda, Kanagawa, all of Japan

[73] Assignee: Mitsubishi Jidosha Kogyo Kabushiki Kaisha, Tokyo, Japan

[21] Appl. No.: 21,984

[22] Filed: Feb. 24, 1993

[30] Foreign Application Priority Data

Feb. 27, 1992 [JP] Japan .................................. 4-090399
Sep. 24, 1992 [JP] Japan .................................. 4-305802

[51] Int. Cl.$^5$ .............................................. B62D 5/26
[52] U.S. Cl. .................................. 180/24.01; 180/140; 180/154; 280/97; 280/686
[58] Field of Search .............. 180/140, 154, 162, 163, 180/79.4, 144, 24.01; 280/91, 669, 97, 98, 100–102, 109, 113, 120, 121, 122, 699, 686, 682

[56] References Cited

U.S. PATENT DOCUMENTS

| | | | |
|---|---|---|---|
| 2,132,828 | 10/1938 | Montambo | 280/91 |
| 3,871,468 | 3/1975 | Miura | 180/154 |
| 5,234,067 | 8/1993 | Simard | 180/140 |
| 5,255,754 | 10/1993 | Lauronen | 180/24.01 |

FOREIGN PATENT DOCUMENTS

| | | | |
|---|---|---|---|
| 0110655 | 5/1940 | Australia | 180/24.01 |
| 62-194976 | 8/1987 | Japan . | |
| 63-212109 | 9/1988 | Japan . | |
| 2120284 | 9/1990 | Japan . | |
| 0016459 | 6/1916 | United Kingdom | 280/97 |
| WO9114587 | 10/1991 | WIPO . | |

*Primary Examiner*—Margaret A. Focarino
*Assistant Examiner*—Anne Marie Boehler

[57] ABSTRACT

A rear wheel steering device is provided in a vehicle with a simple structure in which rear wheels are supported at both end portions of a rear axle housing along a width direction of a chassis in order to drive the vehicle more stably at high speeds. The rear wheel steering device includes leaf spring devices connected to the chassis through first and second shackle links, respectively, and a rear wheel steering mechanism including an upper radius rod and a pair of lower radius rods, a pair of L-shaped levers, a connecting rod and a rear wheel steering actuator mounted on the chassis so that a rear wheel steering action can be smoothly and stably operated.

21 Claims, 7 Drawing Sheets

REAR WHEEL STEERING DEVICE AND METHOD FOR REAR WHEEL STEERING

BACKGROUND OF THE INVENTION

1. Field of the Invention

The present invention relates to a rear wheel steering device and a method for rear wheel steering for a vehicle with a suspension member having a leaf spring.

2. Description of Related Art

Recently, Japanese Utility Model Laid-Open Publication No. 2-120284 (1990) discloses that a four wheel steering system or a device for steering rear wheels in accordance with front wheel steering has been provided in order to improve an operation stability while driving a vehicle at high speed.

In the above described conventional four wheel steering device, to rotate a rear axle housing around the center point when the rear wheels are steered, the rear axle housing is connected to one end of a bell crank rotatably supported by a leaf spring device. The other end of the bell crank is connected to a piston axis of a hydraulic cylinder device fixed at a differential case provided at the center point of the rear axle housing along a width direction of a chassis.

In the above rear wheel steering device, a rear wheel steering actuator, that is, a hydraulic cylinder device is supported by the rear axle housing which is shocked and displaced along a vertical direction while the vehicle is driven, so that the rear wheel steering device is apt to be damaged early. Thus, a durability of the rear wheel steering device and a reliability for the rear wheel steering device are insufficient.

One example of an actuator for steering rear wheels provided at a chassis is described in Japanese Patent Laid-Open Publication Nos. 62-194976 (1987) and 212109 (1988).

Japanese Patent Laid-Open Publication No. 62-194976 describes a structure in which a rear axle housing is frictionally slided on a leaf spring device and the size of rear wheel steering actuators is large. In this structure, durability of the structure is not enough and reliability for the structure is insufficient. Further, it is necessary to provide a pair of large sized rear wheel steering actuators, so that a weight of the structure becomes heavy and a pipe arrangement for the rear wheel steering actuators becomes complicated.

Japanese Patent Laid-Open Publication No. 63-212109 describes a structure in which a leaf spring device is movable along a longitudinal direction of a chassis. Under the structure, large and heavy leaf springs have to be moved along the longitudinal direction while rear wheels are steered. Also, a pair of left and right rear wheel actuators must be provided so that the rear wheel steering actuators have to become larger and heavy and a pipe arrangement for the rear wheel steering actuators becomes complicated. This structure makes it impossible to provide an economical four wheel steering system.

SUMMARY OF THE INVENTION

An object of the present invention is to provide an economical rear wheel steering device with a simple structure in which rear wheels are supported at both end portions of a rear axle housing along a width direction of a chassis. The rear axle housing is attached to the chassis through a leaf spring device in order to drive a vehicle such as a truck or the like more stably at high speeds.

To accomplish the above purpose, a rear wheel steering device according to an embodiment of the present invention comprises leaf spring devices, the front and rear end portions of a leaf spring device connected to the chassis through a pair of swingable shackle links, a rear axle housing and a rear wheel steering mechanism including an upper radius rod provided along a longitudinal direction of the chassis, a middle portion of the upper radius rod connected to a center portion of the rear axle housing along the width direction of the chassis with both ends of the upper radius rod connected to the chassis, a pair of right and left lower radius rods symmetrically provided with respect to a center line of the chassis along the longitudinal direction, one end of each the lower radius rods connected to the rear axle housing, a pair of left and right L-shaped levers for rotating horizontally and connecting to the opposite end of the respective lower radius rods, a middle portion of each the lower radius rods pivotably supported on the chassis, a connecting rod provided along the width direction with both end portions of the connecting rod connected to the opposite end of each the L-shaped levers, and a rear wheel steering actuator provided at the chassis for rotating the left and right L-shaped levers.

According to one embodiment of the present invention, when one of the L-shaped levers or the connecting rod is driven by the rear wheel steering actuator, the left and right L-shaped levers connected to the connecting rod are rotated so as to displace the left and right lower radius rods along the longitudinal direction. Thereby, the rear axle housing revolves around the middle portion of the upper radius rod so that the rear wheels are steered. Both end portions of each of the leaf spring devices are connected to the chassis through corresponding swingable shackle links, respectively so that the leaf spring device is easily moved along the longitudinal direction. Thus, the rear wheel steering is easily operated and a power for controlling the rear wheel steering actuator can become less.

One rear wheel steering actuator is provided at the chassis so that a pipe arrangement of the rear wheel steering actuator can be simplified and become small. The reliability and durability of the rear wheel steering actuator can be improved.

Further, when a vehicle is accelerated or decelerated, a force is applied to left and right rear wheels toward the same direction and transmitted to the rear axle housing along the longitudinal direction. Such a force can be supported by the lower radius rods, the L-shaped levers and the connecting rod. That is, it is unnecessary for the rear wheel steering actuator to support such a force so that a volume of the rear wheel steering actuator can be small.

According to the embodiment of the present invention, the rear wheel steering actuator is connected to one end of the L-shaped lever. Therein, a portion for connecting the connecting rod and the L-shaped lever is positioned between the one end of the L-shaped lever and a pivotable point of the L-shaped lever. Thus, a steering amount for rear wheels corresponding to a displacement of the rear wheel steering actuator can become small so that a volume of the rear wheel steering actuator can become small and the accuracy for controlling the rear wheel steering can be improved.

In a further embodiment of the present invention, a rear wheel steering actuator comprises a piston provided at a connecting rod and a cylinder attached at a chassis.

BRIEF DESCRIPTION OF THE DRAWINGS

The present invention will become more fully understood from the detailed description given hereinbelow and the accompanying drawings which can given by way of illustration only, and thus are not limitative of the present invention and wherein.

DETAILED DESCRIPTION OF THE PREFERRED EMBODIMENTS

Figure 1:
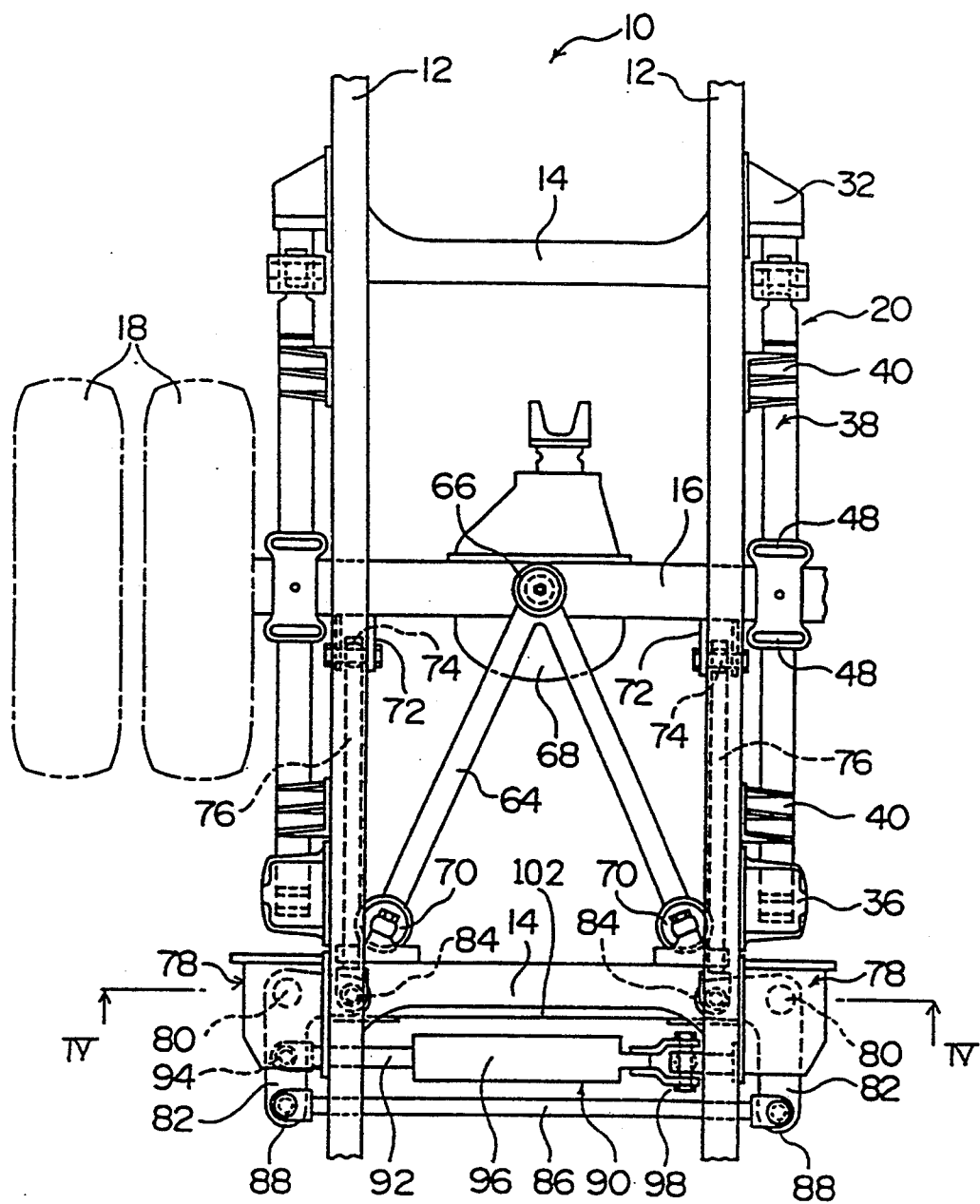
FIG. 1 is a plane view of a main part of the first embodiment of the present invention.

The embodiments according to the present invention will be described with reference to the attached drawings. FIG. 1 through FIG. 6 show the first embodiment of the present invention. In the drawings, 10 refers to a chassis of a vehicle such as a truck. The chassis 10 includes a pair of right- and left-side rails 12 extending along a longitudinal direction of the chassis 10 and a plurality of cross members 14 extending along a width direction of the chassis 10, with both end portions for each of the cross members 14 being fixed at the right and left side rails 12. 16 refers to a rear axle housing. Tires 18 are supported at each of the end portions of the rear axle housing 16, respectively. 20 refers to a main leaf spring (a leaf spring device) of which a front end portion is attached at an upper end of the first shackle link 22 by a pin 24 and a rear end portion is attached at a lower end of the second shackle link 26.

The lower end of the first shackle link 22 is attached to a front shackle bracket 32 by a pin 30. The front shackle bracket 32 is fixed at the side rail 12. An upper end of the second shackle link 26 is attached to a rear shackle bracket 36 by a pin 34 and the rear shackle bracket 36 is fixed at the side rail 12.

A force loaded at a part under the spring is applied at a front end portion of the main leaf spring 20 along a downward direction through the first shackle link 22 and a force loaded at a part above the spring is applied at the rear end portion of the main leaf spring 20 along an upward direction through the second shackle link 26.

38 refers to a helper leaf spring provided on the main leaf spring 20. The helper leaf spring slidable at both end portions by help stoppers 40 when a vehicle weight is over the predetermined weight.

Figure 3:
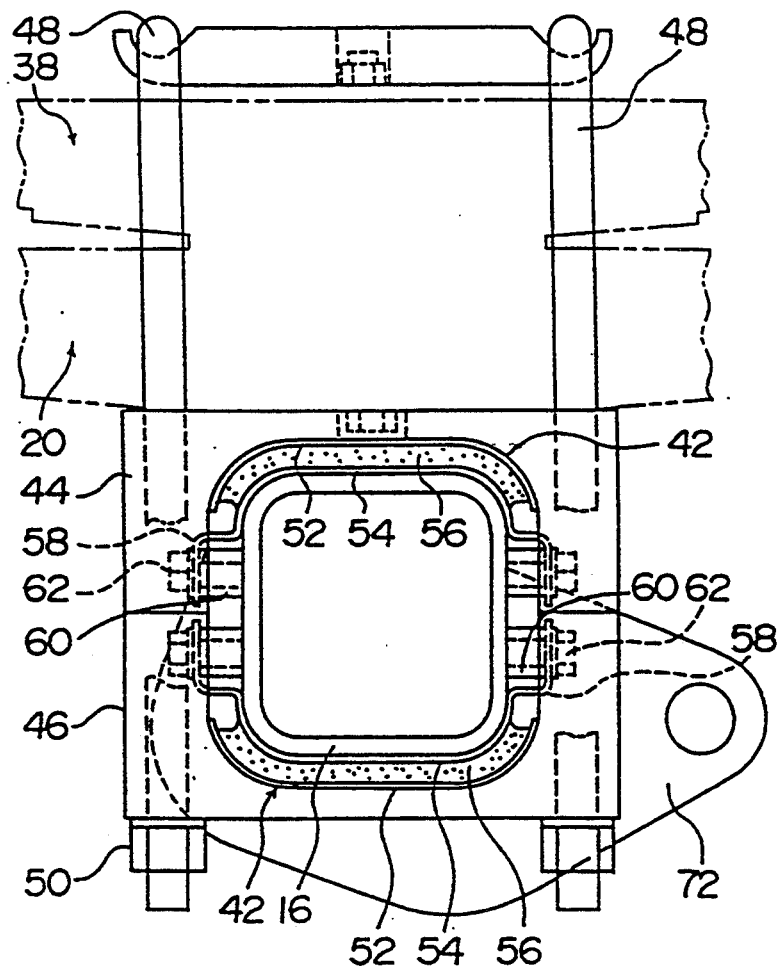
FIG. 3 shows an enlarged side view of a portion for connecting a leaf spring device and a rear axle housing as shown in FIG. 2.

At an upper side surface and a lower side surface of each end portion of the rear axle housing 16, rubber pad members 42 as shown in FIG. 3 are provided, respectively. The upper supporting member 44, of which a side surface has an inverted U-shape, is provided on the upper rubber pad member 42 and the lower rubber pad member 42 is provided on the lower supporting member 48 of which a side surface has a U-shape. A pair of U-shaped bolts 48 are provided at a middle portion of the main leaf spring 20 and the helper leaf spring 38. Leg portions of each of the U-shaped bolts 48 are penetrated to the upper and lower supporting members 44 and 46. Both ends of each of the U-shaped bolts 48 are tightened by nuts 50 so that both end portions of the rear axle housing 16 are connected to the main leaf spring 20 and the helper leaf spring 38 through the rubber pad members 42, respectively.

Each of the rubber pad members 42 include a pair of U-shaped steel back plates 54 of which a groove portion is shallow and a U-shaped rubber pad 56 which is inserted and backed between the U-shaped steel back plates 54. A pair of protruded portions 58 are provided at both sides of the U-shaped steel back plate 54 of each the rubber pad members 42 for confronting with the rear axle housing 16, respectively. Each of the protruded portions 58 is mounted on the front and rear side surfaces of the rear axle housing 16 by fixing protrusions 60 welded on the U-shaped steel back plate 54 and bolts 62, respectively.

As described above, when the U-shaped bolts 48 are tightened, leg portions of the U-shaped bolt 48 inserted between the upper and lower supporting members 44 and 46 have a predetermined length, so that a predetermined compressive force is loaded on the U-shaped rubber pads 56. In the first embodiment, although a leaf spring device for holding the rear wheels includes the main leaf spring 20 and the helper leaf spring 38, it is possible omit the helper leaf spring 38.

An upper radius rod 64 is provided between the side rails 12 of the chassis 10. The upper radius rod 64 is a V-shape and extends horizontally along the longitudinal direction of the chassis 10. A cross point of the V-shape is located on a center line of the chassis 10. The cross point is attached at an upper side of a differential casing 68 provided at a central portion of the rear axle housing 16 through a ball joint device or a rubber bush joint device 70. Both free end portions of the V-shaped rod 64 are attached at the side rail 12 or a cross member 14 through the ball joint device 66, respectively.

Figure 2:
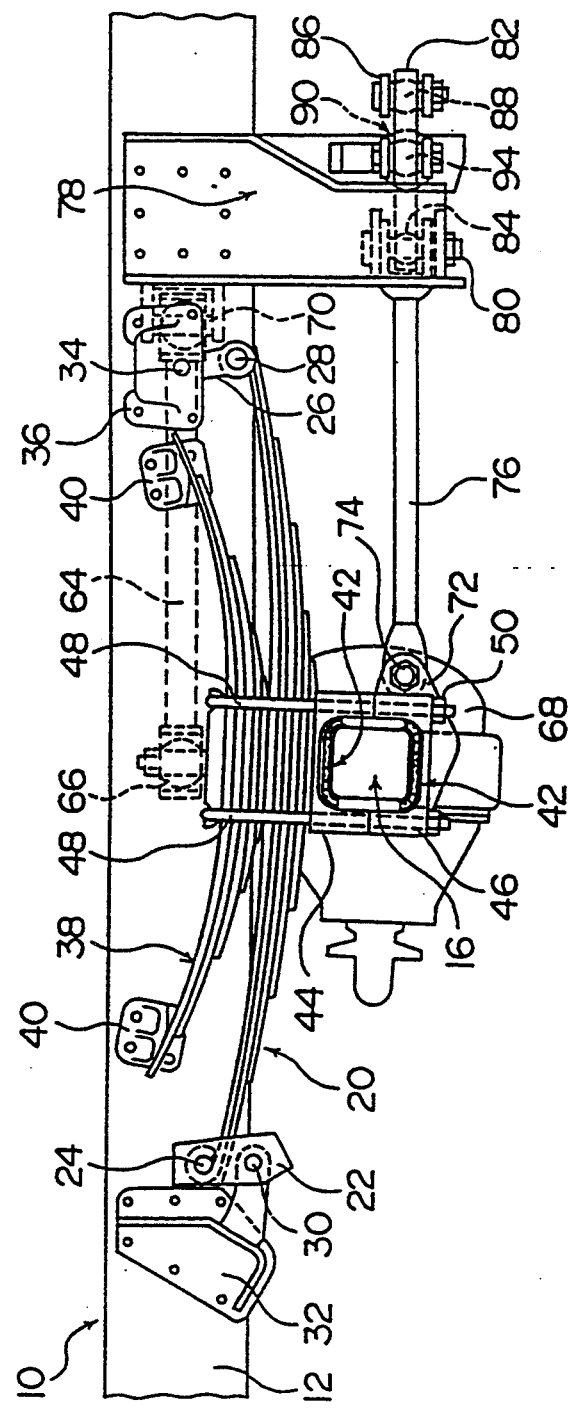
FIG. 2 is a side view of a rear wheel steering device as shown in FIG. 1.

As shown in FIG. 2, a bracket 72 is welded or fixed at a portion near each end portion of the rear axle housing 16. One end of each rod of a pair of right- and left-lower radius rods 76 is attached at the bracket 72 through a ball joint or a rubber bush joint device 74, respectively. The opposite end of each rod of the pair of right- and left-lower radius rods 76 is pivotably attached at a lower end of an operation lever 78 by vertical axes 80 and ball joint devices 84 such as a rubber bush joint device connected to the respective L-shaped lever 82, respectively. Further, both end portions of a connecting rod 86 extending along the width direction of the chassis 10 are connected at the opposite ends of each of the L-shaped levers 82, that is, the tip portion of a long edge 82a of the L-shape lever 82, respectively.

A piston axis 92 of a hydraulic cylinder device 90 for operating as a rear steering actuator is connected to a tip portion of a long edge 82a extending along the longitudinal direction of one of the pair of the L-shaped levers 82, for example, the left L-shaped lever 82 as shown in FIG. 1 through a ball joint device 94 such as a rubber bush joint device. A ball joint device 88 is provided at a middle portion of the long edge 82a positioned between the piston axis 92 connected portion and the vertical axis 80. A cylinder 96 of the hydraulic cylinder device 90 is supported at the bracket 78 mounted on the chassis 10 through a ball joint device 98 such as a rubber bush joint device.

Figure 4:
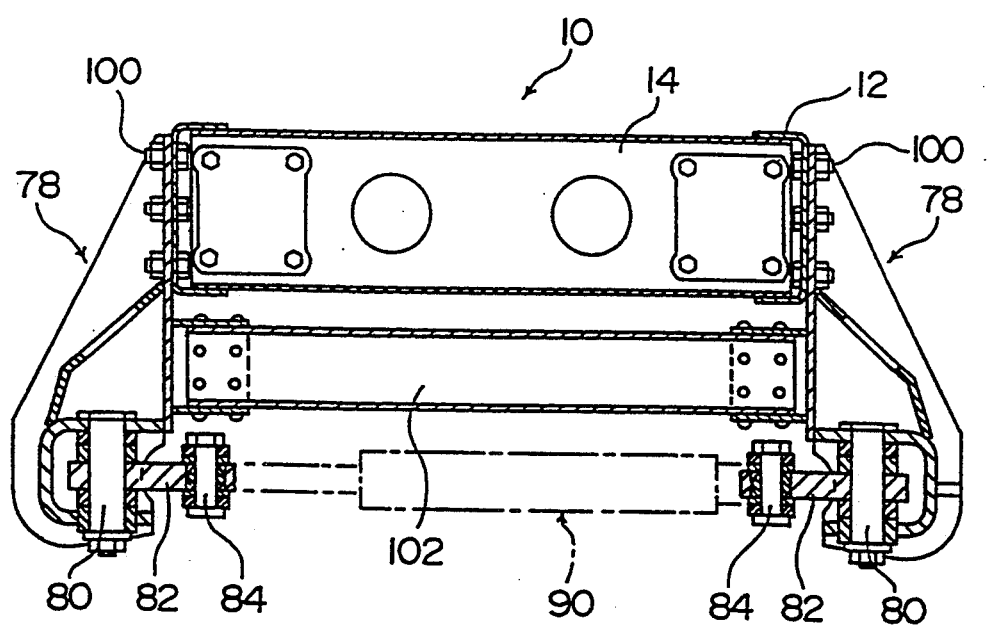
FIG. 4 shows a cross sectional view along a line IV—IV as shown in FIG. 1.

As clearly shown in FIGS. 1 and 4, pillar shaped upper portions of the brackets 78 are fixed at the side rail 12 adjacent to a cross member 14 of the chassis 10 with bolts or rivets 100, respectively. Lower portions of the brackets 78 are fixed at both end portions of a supplemental cross member 102 provided under the chassis 10 and extending along the width direction with bolts or rivets, respectively.

Figure 5:
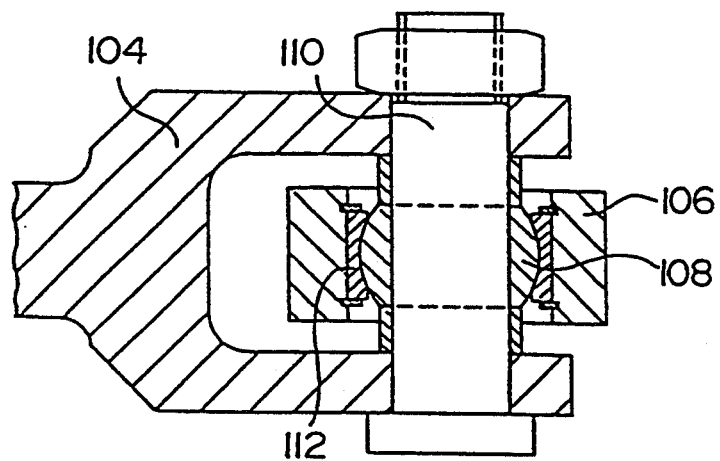
FIG. 5 is a cross sectional view showing a detailed structure of a ball joint device as shown in FIGS. 1 and 2.

A structure of one example of the above described ball joint devices 66, 70, 74, 84, 88, 94 and 98 is shown in FIG. 5. In FIG. 5, 104 refers to the upper radius rod 64 or the lower radius rod 76, the bracket 72, the connecting rod 86, the piston axis 92 and the hydraulic cylinder 96 which forms an axis supporting member. 106 refers to a ball sheet supporting portion formed at other members such as the chassis 10, the L-shaped levers 82 and the differential case 68. An axis 110 having a spherical surface 108 is supported by the member 104. A ball sheet 112 sliding on the spherical surface 108 is supported by a member 106. In this structure, the member 104 can be rotatable within a predetermined angle in a plane perpendicular to an axis line of the axis 110 with respect to the member 106 and another plane including the axis line.

Figure 6:
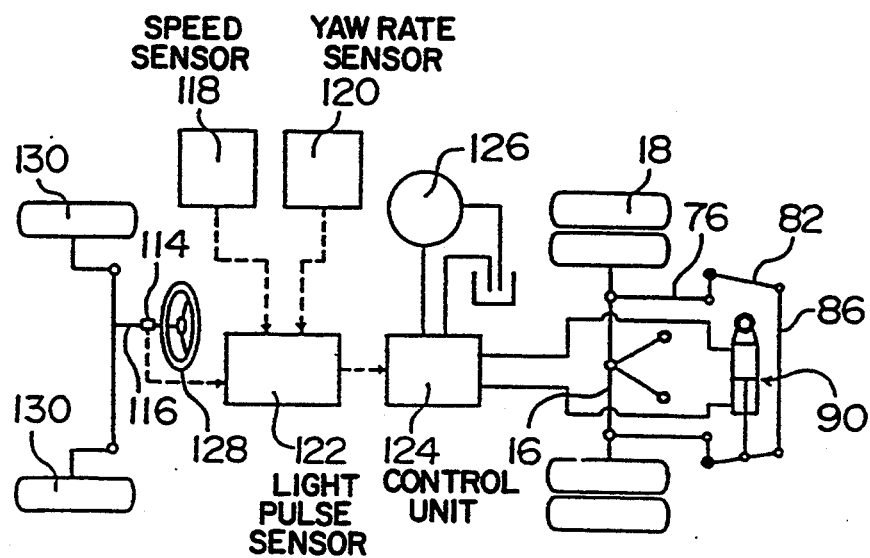
FIG. 6 shows a structure of an operation control device for a rear wheel steering actuator as shown in FIG. 1.

FIG. 6 shows a simple structure of a control unit for controlling an actuation of the rear wheel steering actuator 90. In FIG. 6, 122 refers to a non-contacting light pulse sensor for detecting a steering angle provided at a steering shaft 116. 118 and 120 refer to a car speed sensor and a yaw rate sensor, respectively. 124 refers to a control unit for controlling a control valve which actuates the rear wheel steering actuator 90 by receiving a steering angle signal from the steering angle sensor 122, the car speed signal from the car speed sensor 118 and a yaw rate signal from the yaw rate sensor 120. 128 refers to a hydraulic pump.

When a vehicle is driven at high speeds and front wheels 130 are steered in accordance with an operation of a steering wheel 128, the control unit 124 receives the steering angle signal from the steering angle sensor 122, the car speed signal from the car speed sensor 118 and the yaw rate signal from the yaw rate sensor 120 and outputs a drive signal to the control valve. Then, the control valve is actuated and a hydraulic fluid pumped from the hydraulic pump 126 is supplied to the rear wheel steering actuator 90. The rear wheel steering actuator 90 is extended or shrunk in accordance with a steering direction of the front wheels 130.

Usually, in a case where the rear wheels 18 are steered in order to improve a stability of a vehicle driving at high speeds, the rear wheels 18 are steered at a small angle, for example, 1°~5° toward the same steering direction of the front wheels 130. However, it is possible to utilize a new rear wheel steering system, in which the rear wheels 18 are initially turned toward the opposite steering direction of the front wheels 130 at a small angle and at the same moment the rear wheels 18 are steered at a small angle toward the same steering direction of the front wheels 130.

When a vehicle drives at high speeds and the front wheels 130 are steered, the control valve is actuated in accordance with a signal from the control unit 124 and the rear wheel steering actuator 90 is extended or shrunk. For example, when the rear wheel steering actuator 90 is extended, a left L-shaped lever 82 in FIG. 1 rotates in a clockwise direction around the vertical axis 80 and then the lower radius rod 76 connected to a right side edge of the L-shaped lever 82 is moved frontwardly with respect to the chassis 10. As a result, the rear axle housing 16 rotates around the central point of the ball joint device 66 at the cross point of the V-shaped upper radius rod 64 so that the stability for driving a vehicle at high speeds is improved.

When the rear axle housing 16 is rotated for steering, the U-shaped rubber pad 56 of the rubber pad member 42, of which a groove portion is shallow, inserted between an end portion of the rear axle housing 16 and the main leaf spring 20 and the helper leaf spring 38, is flexibly deformed since the U-shaped rubber pad 56 is applied with a compressive load. By producing a flexible shearing deformation of the U-shaped rubber pad 56, the main leaf spring 20 and the helper leaf spring 38 are smoothly rotated with respect to the rear axle housing 16.

In the conventional device described in Japanese Utility Model Laid-Open Publication No. 2-120284/1991, a rear wheel steering actuator is not attached to the rear axle housing, since the rear axle housing is always shocked and displaced while a vehicle is driven. On the other hand, in an embodiment according to the present invention, the rear wheel steering actuator 90 is supported by the chassis 10 which is shocked and displaced much less than the rear axle housing 16, so that the rear wheel steering actuator 90 is prevented from being damaged and the durability and reliability of the rear wheel steering actuator 90 are improved.

While the rear wheels are steered, a relative rotational displacement with respect to the main leaf spring 20 and the helper leaf spring 38 is smoothly allowed by a shearing deformation of the rubber pad 56 of the rubber pad member 42. On the other hand, in the above described conventional device in which a spring sheet and a slider are slided and displaced along a circular sliding surface while rear wheels are steered, mud, sand and small stones may adhere to a connected portion of a rear axle housing and the leaf spring devices while a vehicle is driven, so that a relative displacement is not smoothly allowed. In the embodiment of the present invention, mud, sand and small stones are not attached at a connected portion of the rear axle housing and the main leaf spring 20 and the helper leaf spring 38 so that the relative displacement is smoothly allowed and any frictional force does not occur. Thus, a rear wheel steering actuator can be obtained having a strong durability and high reliability. Further, the rear wheel steering actuator and relative members such as the hydraulic control valve and the hydraulic source can become smaller and lighter and the manufacturing costs are thereby reduced.

In the embodiment according to the present invention, when a vehicle is accelerated or decelerated, a forced applied to the rear axle housing 16 along the longitudinal direction is transmitted to the connecting rod 86 through the pair of left and right lower radius rods 76 and the pair of L-shaped levers 82. Therefore, such a force is not substantially transmitted to the rear wheel steering actuator 90, so that the rear wheel steering actuator 90 and relative members such as a hydraulic source and a hydraulic control valve can become smaller and lighter and the manufacturing costs are thereby reduced.

Further, the pillar shaped upper portions of the pair of left and right brackets 78 for supporting the L-shaped levers 82 is fixed at the chassis 10 adjacent to the cross member 14, respectively and the lower portions of the brackets 78 are fixed at both end portions of the supplemental cross member 102 arranged along the width direction of the chassis 10, respectively so that the left and right brackets 78 do not incline outwardly along the width direction and a certain steering angle can be maintained.

In accordance with a vertical movement of the rear axle housing with respect to the chassis 10 when the vehicle is driven at high speeds or the rear wheels are steered, such a movement is received as a load by the main leaf spring 20 and the helper leaf spring 38. At that time, the rear axle housing 16 acts as a parallel link movement by the upper radius rod 64 and the lower radius rods 76. Further, the upper radius rod 64 is attached at the rear axle housing 16 and the chassis 10 through the ball joint devices 66 and 70 or the similar rubber bush joint devices. The lower radius rods 76 are pivotably supported by the rear axle housing 16 and the L-shaped levers pivotably supported on the chassis 10 through the similar ball joint devices 74 and 84 or the similar rubber bush joint devices. Therefore, when a vehicle drives on a rough road or turns on a road, and the rear axle housing 16 swings to the left and right, a deformation caused by such a movement is not prevented.

Further, in the first embodiment, the force loaded at the part above the spring is applied to an upward direction at a front end portion of the main leaf spring 20 through the first shackle link 22 and the force loaded at the part under the spring is applied to a downward direction at the rear end portion of the main leaf spring 20 through the second shackle link 26. Regarding the above steering operation, the force loaded at a part above the spring is actuated to return the rear axle housing 16 toward a neutral position so that steering is maintained easily.

Figure 7:
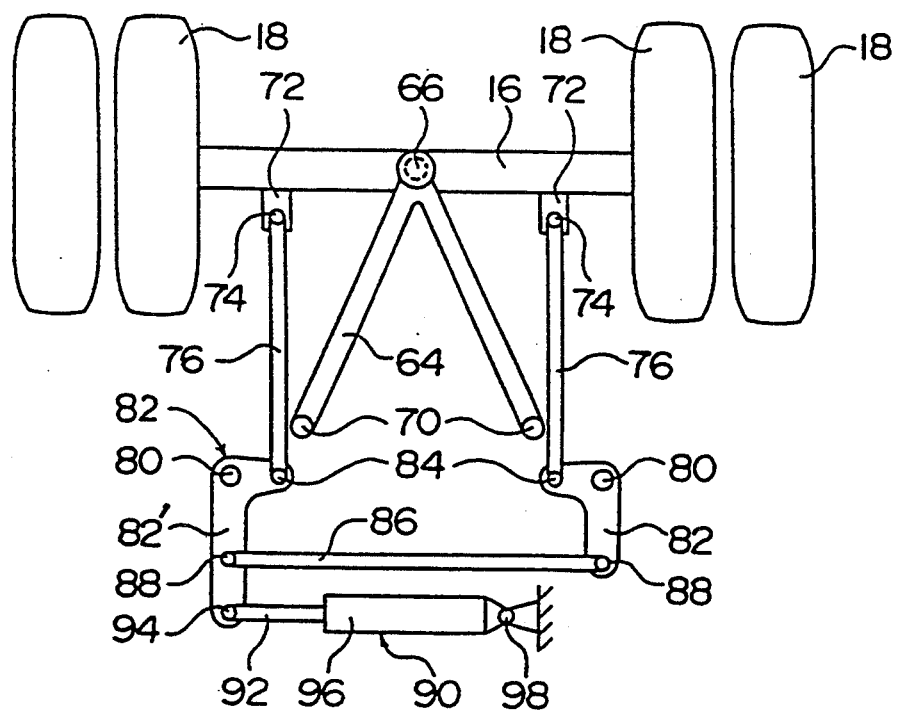
FIG. 7 shows a plane view of a main part of the second embodiment according to the present invention.

FIG. 7 shows a plane view of the second embodiment of the present invention. In the second embodiment, the same members corresponding to the first embodiment have the same numerals, respectively. Therefore, the detailed description thereof is omitted.

In the second embodiment, as shown in FIG. 7, a piston axis 92 of a rear wheel steering actuator 90 is connected to a tip portion of a long edge 82a extending along the longitudinal direction of one of the L-shaped levers 82 through the ball joint device 94. Regarding the vertical axis 80 of the L-shaped lever 82 and the ball joint device, the connecting rod 86 is connected at a portion between the vertical axis 80 and the ball joint portion 94 for the piston axis 92 which is different from the structure of the first embodiment.

According to the second embodiment, the same effect of the first embodiment is obtained. Further, a volume of the rear wheel steering actuator 90 can become smaller than that of the first embodiment and the relative members such as a hydraulic control valve and a hydraulic source can become smaller. As a result, a manufacturing cost can become more economical and a weight of the device can become lighter.

Figure 8:
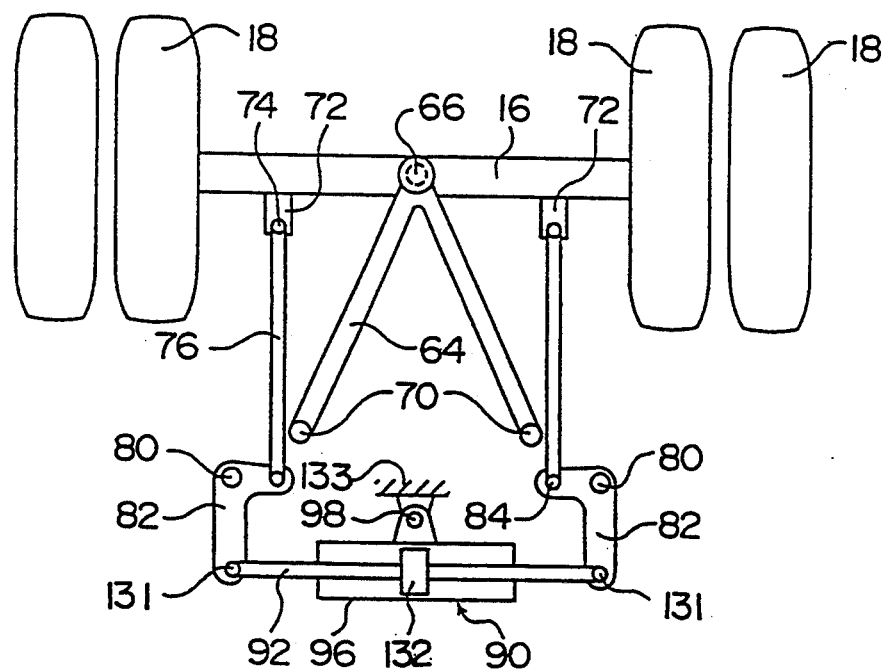
FIG. 8 shows a plane view of a main part of the third embodiment according to the present invention.

FIG. 8 shows the third embodiment of the present invention. In the third embodiment, the same members corresponding to the first and second embodiments have the same numerals, respectively. Therefore, the detailed description thereof is omitted.

In the third embodiment, as shown in FIG. 8, both end portions of a piston axis 92 of a rear wheel steering actuator 90 extending along a width direction of a chassis 10 is connected to the long edge 82a of a pair of left and right L-shaped lever 82 extending along a longitudinal direction of a chassis 10 through ball joint devices 131, respectively. That is, the piston axis 92 is commonly used as the connecting rod 86 of the first embodiment.

A substantial middle portion of the piston axis 92 extending along the width direction is fixed or a cylinder 96 integrally formed with a piston 132 is connected to a cross member 133 of the chassis 10 through a ball joint device or a rubber bush joint device 98.

According to the third embodiment, the same effect of the first embodiment can be obtained. Further, the connecting rod 86 of the first embodiment can be omitted so that a structure of the device can be more simplified, the manufacturing costs can be reduced and a weight of the device can become lighter.

In the above described embodiments, although a vehicle has one axis for front wheels, the same steering systems can be utilized for a vehicle having two rear wheel axes, that is, a front rear axle and a rear rear axle. Ordinally, the rear rear axis is a dead axle which does not transmit a driving force. However, the steering system equipped to the rear rear axis is substantially the same as the one for the front rear axis.

In all of the above described embodiments, a hydraulic cylinder device is shown as the rear wheel steering actuator, it is possible to equip a rack and pinion type actuator, a screw and nut type actuator or the like.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A rear wheel steering device comprising:
   a chassis,
   a rear axle housing for supporting a pair of rear wheels at both end portions of said rear axle housing along a width direction of said chassis,
   a pair of leaf spring devices provided between said rear axle housing and said chassis for supporting said rear axle housing at a middle portion of each pair of said leaf spring devices along a longitudinal direction of said chassis,
   a rear wheel steering mechanism for rotating said rear axle housing around a rotational center positioned on a central line of said chassis along said longitudinal direction of said chassis;
   wherein one of said pair of said leaf spring devices is connected to each side of said chassis, respectively, and both end portions of said leaf spring devices being connected to said chassis through a respective pair of shackle links;
   said rear wheel steering mechanism including,
     an upper radius rod provided along said central line of said chassis, a cross point of said upper radius rod pivotably attached to said rotational center and both end portions of said upper radius rod being connected to said chassis, a pair of lower radius rods provided symmetrically with respect to said central line of said chassis, each of said lower radius rods being connected to said rear axle housing at one end portion of each of said lower radius rods, respectively, a pair of L-shaped levers pivotably supported at a middle portion of a long edge of each of said L-shaped levers for horizontally rotating one end of each of said L-shaped levers being connected to the opposite end of a respective one of said lower radius rods, and a connecting rod provided along said width direction, and both end portions of said connecting rod being connected to the opposite end of said long edge of each of said L-shaped levers; and a rear wheel steering actuator provided at said chassis for rotating said rear axle housing around said rotational center by moving the pair of said lower radius rods in the opposite directions along said longitudinal direction, respectively in accordance with a rotation degree of the pair of said L-shaped levers by driving said L-shaped levers or said connecting rod.

2. A rear wheel steering device of claim 1, wherein said rear wheel steering actuator comprises a hydraulic cylinder arranged along said width direction of said chassis.

3. A rear wheel steering device of claim 1, wherein said rear wheel steering actuator is arranged along said width direction of said chassis and can be extended and shrunk and one end of said rear wheel steering actuator is connected to one of said L-shaped levers and the opposite end of said rear wheel steering actuator is pivotably mounted on said chassis.

4. A rear wheel steering device of claim 3, wherein said rear wheel steering actuator is connected to one of said L-shaped levers at a first portion of said one L-shaped lever and said connecting rod is connected at a second portion of said one L-shaped lever between said first portion and a portion for connecting to said chassis.

5. A rear wheel steering device of claim 1, wherein said rear wheel steering actuator is integrally formed with said connecting rod, said rear wheel steering actuator comprises a piston provided at said connecting rod and a cylinder in which said connecting rod inserted into said cylinder is provided.

6. A rear wheel steering device of claim 5, wherein said cylinder is pivotably mounted on said chassis.

7. A rear wheel steering device of claim 1, wherein a plurality of ball joint devices are provided at a connecting portion of said rear axle housing and said upper radius rod, connecting portions of said rear axle housing and each of said lower radius rods and a connecting portion of each said pair of L-shaped levers and each of said lower radius rods, respectively.

8. A rear wheel steering device of claim 1, wherein said rear wheel steering mechanism is provided behind said rear axle housing with respect to a front face of said chassis.

9. A rear wheel steering device of claim 1, wherein one of each pair of said L-shaped levers is supported at lower edges of a pair of pillow shaped brackets extending perpendicular to said chassis, respectively, upper portions of said pair of pillow shaped brackets are fixed on side rails of said chassis adjacent to cross members of said chassis, respectively and both edge portions of a supplemental cross member provided beyond said chassis is connected to said side rails, respectively.

10. A rear wheel steering device of claim 1, wherein said rear axle housing is connected to each said pair of leaf spring devices by a pair of upper and lower rubber pad members on which predetermined loads are applied by a tightening device, respectively.

11. A rear wheel steering device of claim 10, wherein said tightening device comprises an upper supporting member provided on said upper rubber pad member;

a lower supporting member provided under said lower rubber pad member;

a pair of U-shaped bolts provided at front and rear sides of said rear axle housing and leg portions of each said pair of U-shaped bolts penetrating said upper and lower supporting members; and nuts provided at tip portions of said leg portions for tightening said upper and lower supporting members.

12. A rear wheel steering device of claim 10, wherein each said pair of upper and lower rubber pad members include a pair of back plates and a rubber pad fixed between a pair of said back plates, wherein each said pair of back plates and each said pair of upper and lower rubber pad members are formed in a U-shape of which a grooved portion is shallow.

13. A rear wheel steering device of claim 12, wherein each one of said pair of back plates for contacting said rear axle housing have a pair of protruded portions extending toward front and back directions.

14. A rear wheel steering device of claim 13, wherein one of said pair of shackle links is arranged upwardly and another of said pair of shackle links is arranged downwardly.

15. A rear wheel steering device of claim 14, wherein said pair of shackle links are inclined in a parallel direction.

16. A rear wheel steering device of claim 1, wherein said upper radius rod and said lower radius rods substantially extend in parallel along sides of said chassis.

17. A rear wheel steering device of claim 1, wherein said upper radius rod has a V-shape and a top portion is pivotably attached at said rear axle housing and the both end portions of said upper radius rod are connected to said chassis.

18. A rear wheel steering device of claim 1, further comprising a control unit for controlling an operation of said rear wheel steering actuator in order to steer said rear wheels and said front wheels toward the same direction.

19. A rear wheel steering device of claim 18, wherein said control unit controls said rear wheel steering actuator to steer said rear wheels to the same steering direction as said front wheels immediately after said rear wheels are steered toward the opposite steering direction of said front wheels.

20. A rear wheel steering device comprising:

a chassis;

a rear axle housing for supporting a pair of rear wheels;

a pair of leaf spring devices provided between said rear axle housing and said chassis for supporting said rear axle housing;

a rear wheel steering mechanism for rotating said rear axle housing around a rotational center positioned on a central line of said chassis, said rear wheel steering mechanism including, an upper radius rod provided along said cental line of said chassis, a cross point of said upper radius rod pivotably attached to said rotational center and both end portions of said upper radius rod being connected to said chassis, a pair of lower radius rods provided symmetrically with respect to said central line of said chassis and each of said pair of lower radius rods being connected to said rear axle housing at one end portion of each of said pair of lower radius rods respectively, a pair of L-shaped levers pivotably supported at a middle portion of a long edge of each said pair of L-shaped levers for horizontally rotating one end of each said pair of L-shaped levers being connected to the opposite end of a respective one of said lower radius rods, and a connecting rod having two end portions being connected to the opposite end of said long edge of each said pair of L-shaped levers; and a rear wheel steering actuator provided at said chassis for rotating said rear axle housing around said rotational center.

21. A method for rear wheel steering comprising the steps of:

(a) supporting a pair of rear wheels at both end portions of a rear axle housing along a width direction of a chassis by a rear axle housing;

(b) supporting said rear axle housing by a pair of leaf spring devices provided between said rear axle housing and said chassis;

(c) rotating said rear axle housing around a rotational center positioned on a central line of said chassis by a rear wheel steering mechanism;

(d) providing an upper radius rod along said central line of said chassis, pivotably attaching a cross point of said upper radius rod to said rotational center and connecting both end portions of said upper radius rod to said chassis;

(e) symmetrically providing a pair of lower radius rods with respect to said central line of said chassis and connecting each of said pair of lower radius rods to said rear axle housing at one end portion of each said pair of lower radius rods;

(f) pivotably supporting a pair of L-shaped levers at a middle portion of a long edge of each said pair of L-shaped levers and horizontally rotating one end of each said pair of L-shaped levers connected to the opposite end of a respective one of said lower radius rod;

(g) connecting both end portions of a connecting rod to the opposite end of said long edge of each said pair of L-shaped levers; and (h) rotating said rear axle housing around said rotational center by a rear wheel steering actuator provided at said chassis.

* * * * *